United States Patent
Assefa et al.

(10) Patent No.: US 8,867,920 B2
(45) Date of Patent: Oct. 21, 2014

(54) OPTICAL DE-MULTIPLEXING DEVICE

(75) Inventors: Solomon Assefa, Ossining, NY (US); Douglas M. Gill, South Orange, NJ (US); Jonathan E. Proesel, Yorktown Heights, NY (US); Alexander V. Rylyakov, Mount Kisco, NY (US); Clint L. Schow, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/556,603

(22) Filed: Jul. 24, 2012

(65) Prior Publication Data

US 2014/0029949 A1 Jan. 30, 2014

(51) Int. Cl.
 H04J 14/00 (2006.01)
 H04J 4/00 (2006.01)
 H04J 14/02 (2006.01)
 H04B 10/06 (2006.01)

(52) U.S. Cl.
 USPC ............. 398/124; 398/68; 398/75; 398/84; 398/85; 398/87; 398/202; 398/207

(58) Field of Classification Search
 CPC . H04B 10/0771; H04B 10/0791; H04J 14/02; H04J 14/0227; H04J 14/0282; H04J 14/0246; H04J 14/0241
 USPC ............. 398/75, 68, 202, 207, 84, 85, 87; 385/27
 See application file for complete search history.

(56) References Cited

U.S. PATENT DOCUMENTS

| | | | |
|---|---|---|---|
| 5,136,671 A | 8/1992 | Dragone | |
| 5,448,351 A | 9/1995 | Florek et al. | |
| 5,450,511 A | 9/1995 | Dragone | |
| 6,263,127 B1 * | 7/2001 | Dragone et al. | 385/24 |
| 6,594,409 B2 | 7/2003 | Dutt et al. | |
| 6,754,411 B2 | 6/2004 | Ahmadvand et al. | |
| 7,050,719 B2 * | 5/2006 | Lemoff et al. | 398/79 |
| 7,215,422 B2 | 5/2007 | Florek et al. | |
| 7,283,692 B2 * | 10/2007 | Xiao et al. | 385/12 |
| 7,483,633 B2 * | 1/2009 | Ishimura | 398/75 |
| 7,970,280 B2 | 6/2011 | Morton | |
| 2003/0030866 A1 * | 2/2003 | Yoo | 359/128 |
| 2004/0096151 A1 * | 5/2004 | Svilans et al. | 385/27 |
| 2004/0161194 A1 * | 8/2004 | Mittelstein et al. | 385/37 |
| 2005/0058128 A1 * | 3/2005 | Carson et al. | 370/388 |

(Continued)

OTHER PUBLICATIONS

Chen, J.C., et al., "A Proposed Design for Ultralow-loss Waveguide Grating Routers," IEEE Photonics Technology Letters, vol. 10, Issue 3, Mar. 1998, pp. 379-381.

(Continued)

Primary Examiner — David Payne
Assistant Examiner — Pranesh Barua
(74) Attorney, Agent, or Firm — Cantor Colburn LLP; Vazken Alexanian

(57) ABSTRACT

An electro-optical device includes an optical de-multiplexing portion operative to output a first optical signal having a first wavelength and a second optical signal having a second wavelength, an array of photodetectors, and a switching logic portion communicatively connected to the array of photodetectors, the switching logic portion operative to determine which photodetector of the array of photodetectors is converting the first optical signal into a first electrical signal and output the first electrical signal from a first output node associated with the first optical signal.

7 Claims, 6 Drawing Sheets

(56) References Cited

U.S. PATENT DOCUMENTS

| | | | |
|---|---|---|---|
| 2008/0304830 A1* | 12/2008 | Huang et al. | 398/79 |
| 2011/0038631 A1* | 2/2011 | Doerr | 398/65 |
| 2012/0087678 A1* | 4/2012 | Earnshaw | 398/202 |
| 2012/0269510 A1* | 10/2012 | Hui et al. | 398/50 |

OTHER PUBLICATIONS

Inoue, Y., et al., "Thermal Silica-based Arrayed Waveguide Grating Multiplexer," Electronics Letters, vol. 33, Issue 23, Nov. 6, 1997, pp. 1945-1947.

Koteles, E.S., et al., "Waveguide Grating-based Spectrometric Transducers," IEEE Instrumentation and Measurement Magazine, vol. 7, Issue 2, Jun. 2004, pp. 33-42.

Vidal, B., et al., "Optical Delay Line Based on Arrayed Waveguide Grantings' Spectral Periodicity and Dispersive Media for Antenna Beamforming Applications," IEEE Journal of Selected Topics in Quantum Electronics, vol. 8, Issue 6, Nov./Dec. 2002, pp. 1202-1210.

* cited by examiner

OPTICAL DE-MULTIPLEXING DEVICE

FIELD OF INVENTION

The present invention relates generally to electro-optical systems, and more specifically, to electro-optical de-multiplexing devices.

DESCRIPTION OF RELATED ART

Previous electro-optical systems often included multiplexing (MUX) and de-multiplexing devices that multiplex or de-multiplex channels of light signals. The channels of the light signals may be defined by the wavelengths of the light in the signals. A de-MUX system for example, may include an arrayed waveguide grating (AWG) unit that receives a light signal via, for example, an optical fiber. The AWG includes a bundle of optical fibers or waveguides each having different lengths that affects a phase shift to the light signal as the signal exits the waveguides. The phase shift of the light is dependent on the relative length differences between the waveguides and the wavelengths of the light signal. Thus, for a light signal that includes a plurality of different wavelengths (i.e., channels), the plurality of waveguides may effectively separate the channels and direct the each channel to a corresponding second waveguide that may terminate at an optical detector unit.

Since the length of the waveguides in the AWG units affect the phase shift, the lengths of the waveguides should remain constant to avoid an undesirable phase shift. If the temperature of the AWG units changes, the lengths of the waveguides may change. Therefore, AWG units are often used with a thermal regulating unit that keeps the AWG units at a constant temperature.

BRIEF SUMMARY

According to an embodiment of the present invention, an electro-optical device includes an optical de-multiplexing portion operative to output a first optical signal having a first wavelength and a second optical signal having a second wavelength, an array of photodetectors, and a switching logic portion communicatively connected to the array of photodetectors, the switching logic portion operative to determine which photodetector of the array of photodetectors is converting the first optical signal into a first electrical signal and output the first electrical signal from a first output node associated with the first optical signal.

According to another embodiment of the present invention, an electro-optical system includes an arrayed waveguide grating (AWG) portion operative to output a first optical signal having a first wavelength and a second optical signal having a second wavelength, an array of photodetectors, a switching logic portion communicatively connected to the array of photodetectors, the switching logic portion operative to determine which photodetector of the array of photodetectors is converting the first optical signal into a first electrical signal and output the first electrical signal from a first output node associated with the first optical signal, and a processor communicatively connected to the first output node.

According to yet another embodiment of the present invention, an electro-optical de-multiplexing device includes an arrayed waveguide grating (AWG) portion operative to output a first optical signal having a first wavelength and a second optical signal having a second wavelength, a switching logic portion comprising a first input node, a second input node, a third input node, a fourth input node, and a first output node, a first array of photodetectors comprising a first photodetector communicatively connected to a first input node of the switching logic portion, and a second photodetector communicatively connected to a second input node of the switching logic portion, and a second array of photodetectors comprising a third photodetector communicatively connected to a third input node of the switching logic portion, and a fourth photodetector communicatively connected to a fourth input node of the switching logic portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
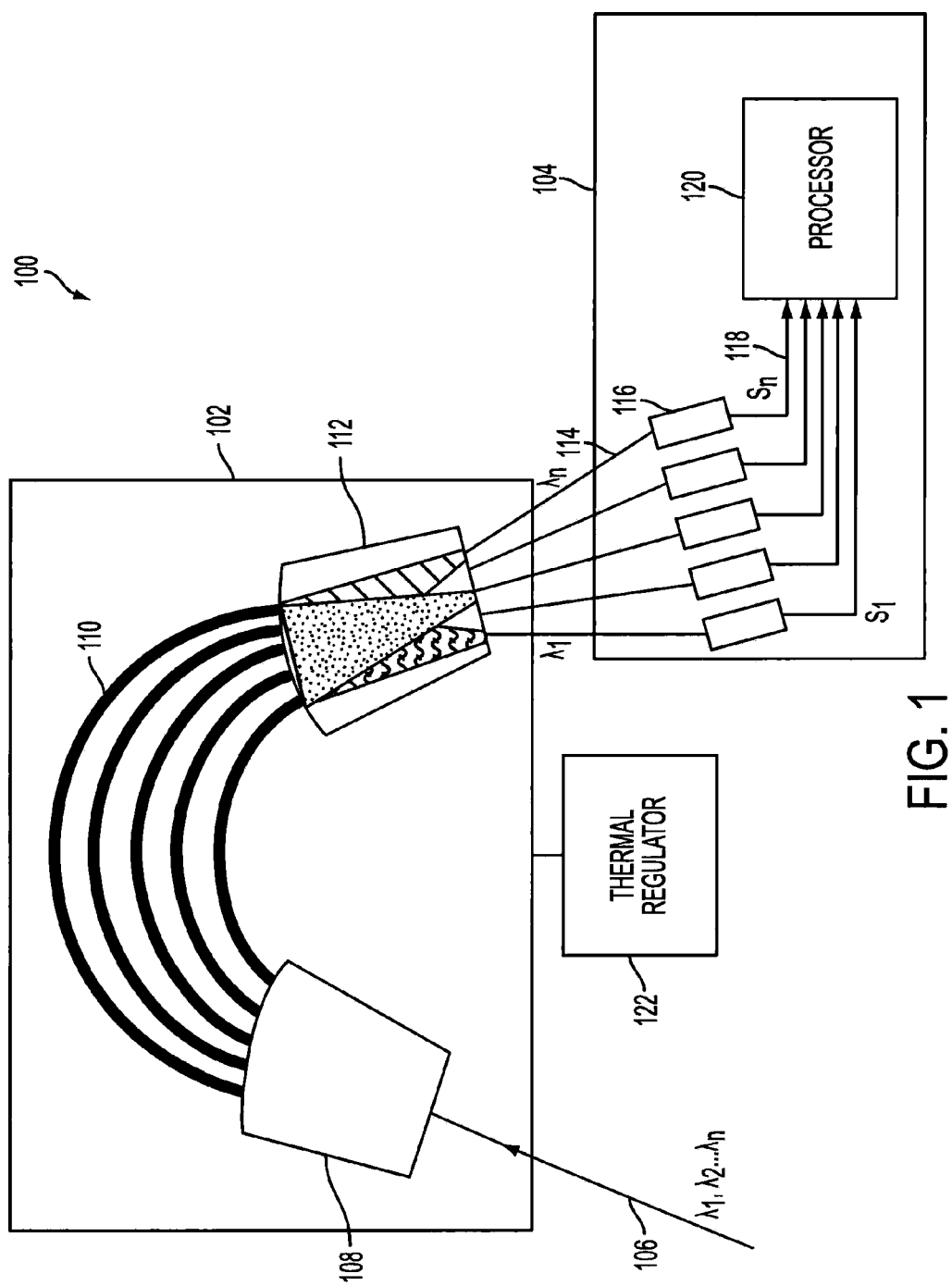
FIG. 1 illustrates a prior art example of a dynamic arrayed waveguide grating AWG system.

FIG. 1 illustrates a prior art example of a dynamic arrayed waveguide grating AWG de-multiplexor (de-MUX) system 100. Though the illustrated embodiments include an AWG type de-multiplexor, alternate embodiments may include any type of optical de-MUX device such as, for example cascaded asymmetric Mach-Zehnder Interferometers, Echelle gratings, or thin film interference based devices.

In this regard, the system 100 includes an AWG unit 102 that is communicatively connected to a processor unit 104 and an optical fiber 106 that carries an optical signal having a plurality of channels each having a different wavelength ($\lambda_1$, $\lambda_2 \ldots \lambda_n$). The AWG unit 102 may be formed on, for example a silicon substrate. The optical signal enters a free space portion 108 of the AWG unit 102 and waveguides 110 each having a different length. The light passes through the waveguides 110 and enters another free space portion 112. The length of each waveguide 110 affects a particular phase shift on each channel due to the difference in wavelength of each of the channels. Light diffracted from each waveguide 110 interferes constructively in the second free space portion, and is refocused and directed to a particular output position. In the illustrated example, the output positions are corresponding output waveguides 114. The output waveguides 114 direct each of the channels to a corresponding photodetector device 116 of the processor unit 104 that converts the optical channel signal into an electrical signal 118 ($S_1, S_2 \ldots S_n$) that is received by a processor 120. The length of the waveguides 110 may be affected by the temperature of the AWG unit 102, and it is desirable to maintain the lengths of the waveguides 110 at particular lengths to maintain the desired phase shifts of the channels. If the phase shifts change due to temperature variations in the AWG unit 102, the output positions of the channels may change resulting in a loss of a channel signal, or the channel signals may be routed to an incorrect output waveguide 114. Thus, a thermal regulator unit 122 maintains the AWG unit 102 at a constant temperature.

The thermal regulator unit 122 is expensive to maintain and operate, and presents a risk of system failure if the thermal regulator unit 122 cannot maintain the AWG unit 102 at a constant temperature. The prior art example of FIG. 1 does not facilitate efficient integration of an AWG unit with a processing unit on a common wafer or chip due to the use of the thermal regulator unit 122.

Figure 2A:
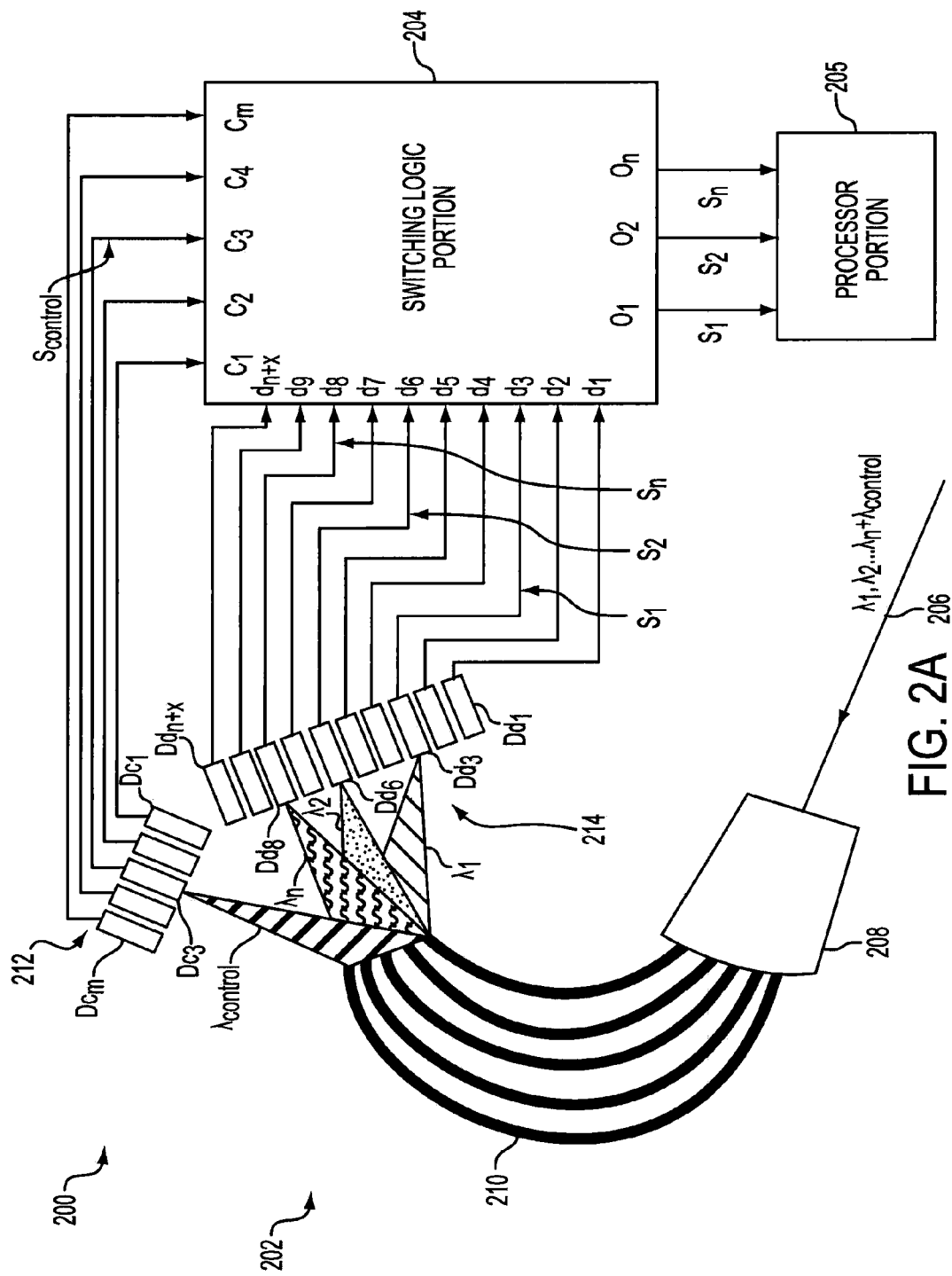
FIGS. 2A and 2B illustrate an exemplary embodiment of system that includes an AWG and a switching logic portion.

FIG. 2A illustrates an exemplary embodiment of system 200 that includes an AWG 202 and a switching logic portion 204 that may be integrated on a common wafer or chip. The switching logic portion 204 may include, for example, a processor, or other logic devices. The switching logic portion 204 may be communicatively connected to a processor portion 205. The system 200 is operative to accommodate fluctuations in the temperature of the AWG 202 dynamically during the operation of the system 200. In this regard, the system 200 includes a AWG 202 that is communicatively connected to a switching logic portion 204 and an optical fiber 206 that carries an optical signal having a plurality of channels each having a different wavelength ($\lambda_1, \lambda_2 \ldots \lambda_n + \lambda_{control}$). The optical signal enters a free space portion 208 of the AWG 202 and waveguides 210 each having a different length. The light passes through the waveguides 210, which impart a phase shift on the light. The light is diffracted from each waveguide 210 and through constructive interference, each channel is focused on a photodetector that converts the light into an electrical signal ($S_1, S_2, \ldots S_n + S_{control}$) that is received by the switching logic portion 204. The system 200 includes two photodetector arrays; a control array 212 and a data array 214. The control array 212 includes a plurality of photodetectors ($Dc_1$-$Dc_m$) with each photodetector communicatively connected to a corresponding control input node ($C_1$-$C_m$) of the switching logic portion 204. The data array 214 includes a plurality of photodetectors ($Dd_1$-$Dd_{n+x}$) with each photodetector communicatively connected to a corresponding data input node ($d_1$-$d_{n+x}$) of the switching logic portion 204.

In operation, the switching logic portion 204 is operative to determine which photodetector of the control array 212 is receiving the $\lambda_{control}$ channel by determining which control input node is receiving the $S_{control}$ signal. In the illustrated exemplary embodiment, the $\lambda_{control}$ channel is focused on and impinges on the $Dc_3$ photodetector, and thus, the $Dc_3$ photodetector outputs the $S_{control}$ signal to the control input node $C_3$ of the switching logic portion 204.

Once the switching logic portion 204 determines which photodetector of the control array 212 is receiving the $\lambda_{control}$ channel, the processor associates the data input nodes ($d_1$-$d_{n+x}$) of the switching logic portion 204 with the channels $\lambda_1, \lambda_2 \ldots \lambda_n$. In the illustrated exemplary embodiment, when the $\lambda_{control}$ channel is focused on and impinges on the $Dc_3$ photodetector, the $\lambda_1$ channel is focused on and impinges on the $Dd_3$ photodetector, which outputs the $S_1$ data signal to the $d_3$ data input node of the switching logic portion 204. Similarly, the $\lambda_2$ channel is focused on and impinges on the $Dd_6$ photodetector, which outputs the $S_2$ data signal to the $d_6$ data input node and the $\lambda_n$ channel is focused on and impinges on the $Dd_8$ photodetector, which outputs the $S_n$ data signal to the $d_8$ data input node. In some embodiments, the switching logic portion 204 may determine that a channel $\lambda_n$ is focused on and impinges on more than one photodetector $Dd_n$. In this regard, the switching logic portion 204 may output signals from both photodetectors that are receiving the signal $\lambda_n$ to a single output channel $S_n$ if desired.

Once the switching logic portion 204 has associated the data input nodes ($d_1$-$d_{n+x}$) of the switching logic portion 204 with the channels $\lambda_1, \lambda_2 \ldots \lambda_n$, the switching logic portion 204 affects a communicative connection between the associated data input nodes and output nodes ($O_1, O_2 \ldots O_n$) that output the signals ($S_1, S_2 \ldots S_n$) respectively to the processor portion 205 that may process the signals. The logic switching portion 204 may include, for example, an arrangement of switches disposed between the data input nodes and the output nodes such that each data input node may be selectively communicatively connected to a desired output node. The logic switching portion 204 is operative to change the states of the arrangement of switches to connect a particular data input node to a particular output node.

Since the system 200 does not include a thermal regulating unit, the temperature of the AWG 202 may fluctuate. The fluctuation of the temperature of the AWG 202 may affect the optical path lengths of the waveguides 210 such that the focus of the signals ($\lambda_1, \lambda_2 \ldots \lambda_n + \lambda_{control}$) may be shifted to different photodetectors.

The illustrated embodiment includes photodetectors ($Dd_1$-$Dd_{n+x}$) in the data array 214 such that there are n+x number of photodetectors and corresponding data input nodes in the system 200. In this regard, the value of x may be any desired number to accommodate the spatial shifting of the focus of the signals ($\lambda_1, \lambda_2 \ldots \lambda_n$). Similarly, the system 200 includes ($Dc_1$-$Dc_m$) number of photodetectors Dc in the control array 212 where m may be any desired number to accommodate the spatial shifting of the focus of the $\lambda_{control}$ signal.

Figure 2B:
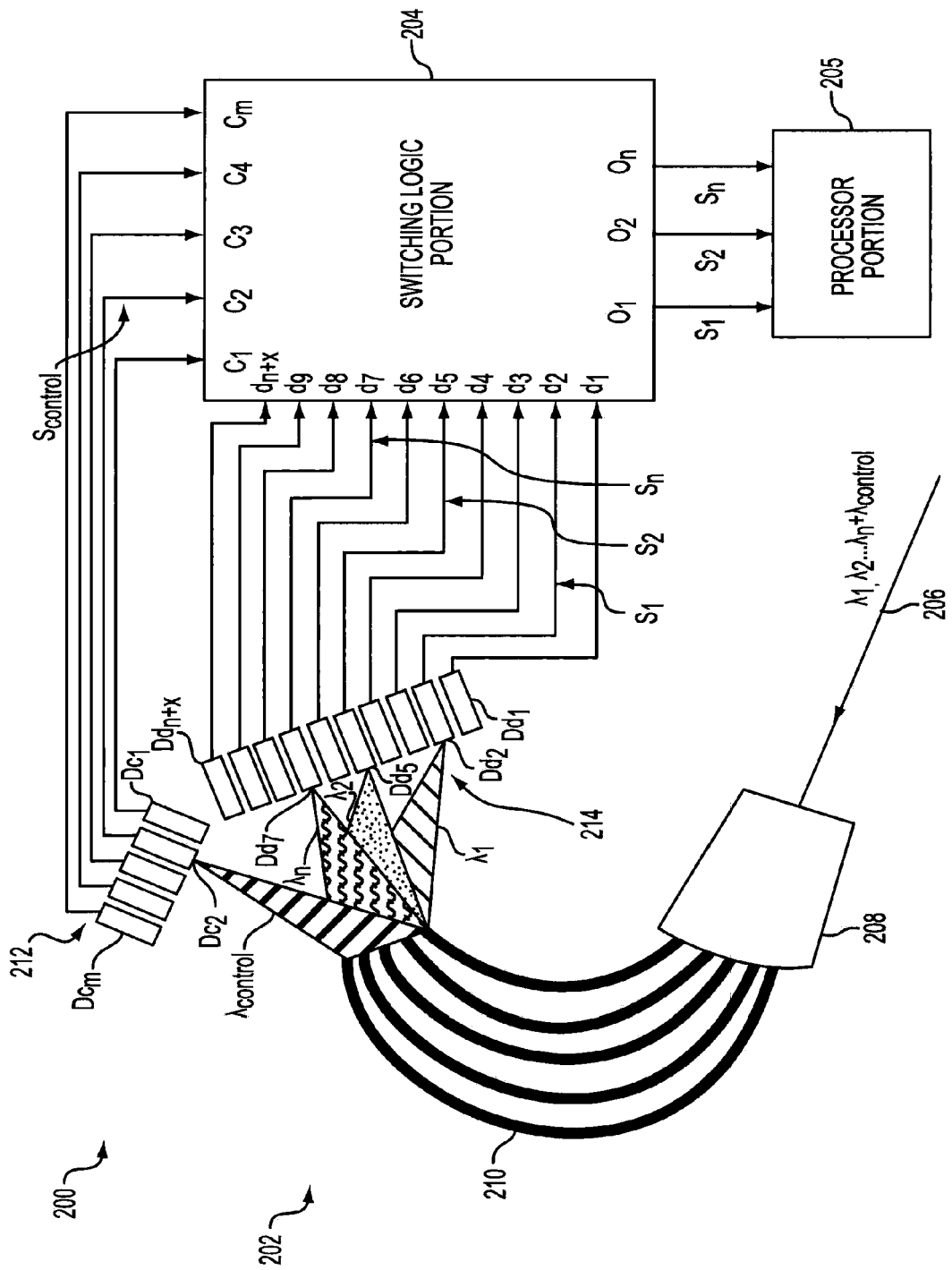

FIG. 2B illustrates the system 200 where the focus of the signals ($\lambda_1, \lambda_2 \ldots \lambda_n + \lambda_{control}$) has shifted. In this regard, the $\lambda_{control}$ channel is focused on and impinges on the $Dc_2$ photodetector of the control array 212. The $Dc_2$ photodetector outputs the $S_{control}$ signal to the control input node $C_2$ of the switching logic portion 204. Likewise, the $\lambda_1, \lambda_2$, and $\lambda_n$ signals have shifted focus to the $Dd_7, Dd_5$, and $Dd_2$ photodetectors respectively of the data array 214. Thus, the signals $S_1, S_2$, and $S_n$ are received at the data input nodes $d_2, d_5$, and $d_7$ respectively of the switching logic portion 204. When the switching logic portion 204 determines that the $S_{control}$ signal is received in the control input node $C_2$, the switching logic portion 204 associates the data input nodes $d_2, d_5$, and $d_7$ of the switching logic portion 204 with the channels $\lambda_1, \lambda_2$, and $\lambda_n$. The switching logic portion 204 affects a communicative connection between the associated data input nodes and output nodes ($O_1, O_2 \ldots O_n$) that output the signals ($S_1, S_2 \ldots S_n$) respectively to the processor portion 205 that may process the signals.

Figure 3:
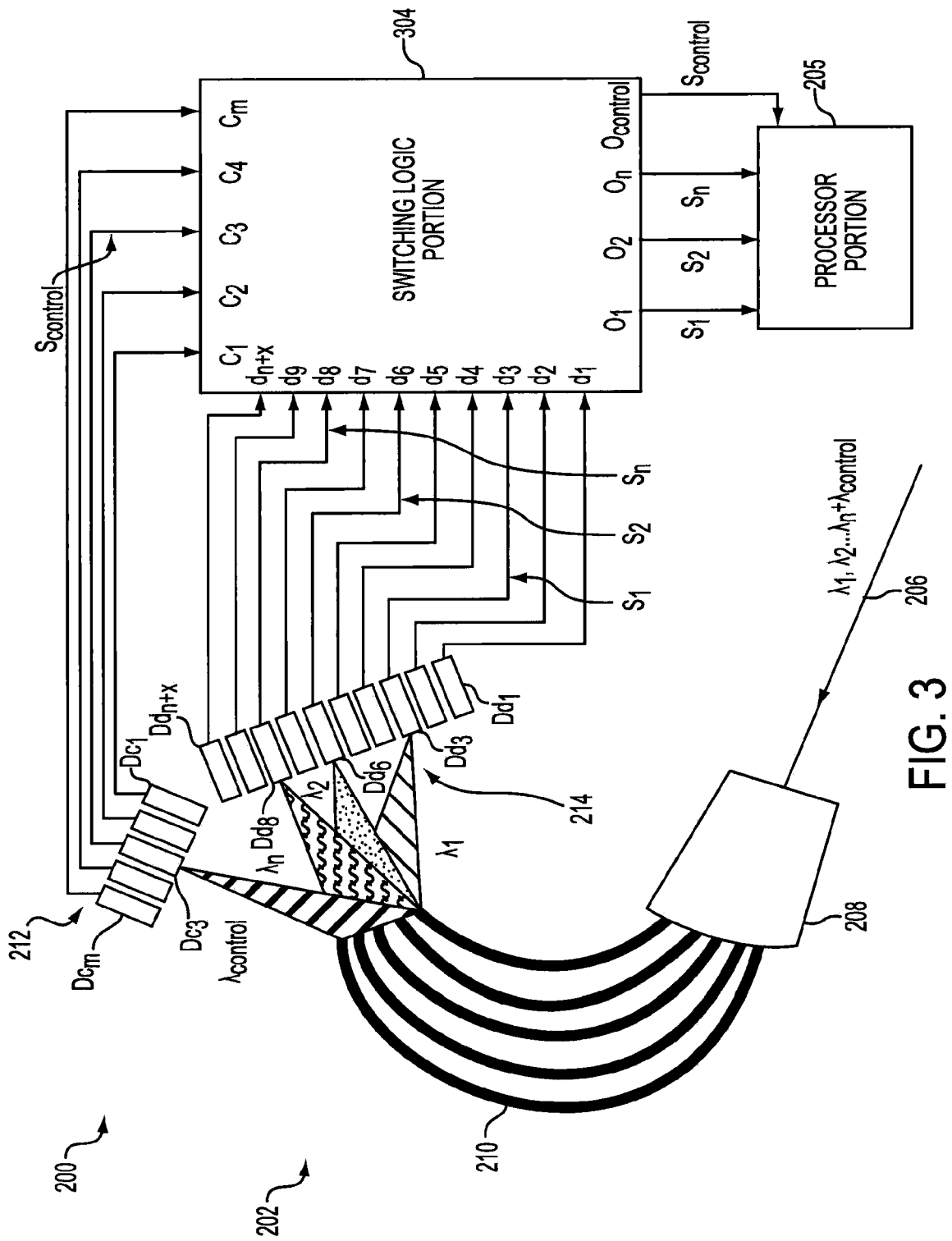
FIG. 3 illustrates an alternate exemplary embodiment of a system that includes an AWG and a switching logic portion.

FIG. 3 illustrates an alternate exemplary embodiment of a system 300 that is similar in operation to the system 200 described above. In this regard, the $\lambda_{control}$ channel may include data that may be output to the processor portion 205. Thus, the control input nodes (e.g., $C_3$) may be communicatively connected to an output node ($O_{control}$) that outputs the $S_{control}$ signal. In such an exemplary embodiment, the $S_{control}$ signal may be used to transmit data as well as affect the control of the switching logic portion 304. In the illustrated embodiments, the control array 212 and the data array 214 are merely arranged in an exemplary configuration. The photodetectors of the respective arrays may be arranged in any suitable or desired alternate arrangement.

Figure 4:
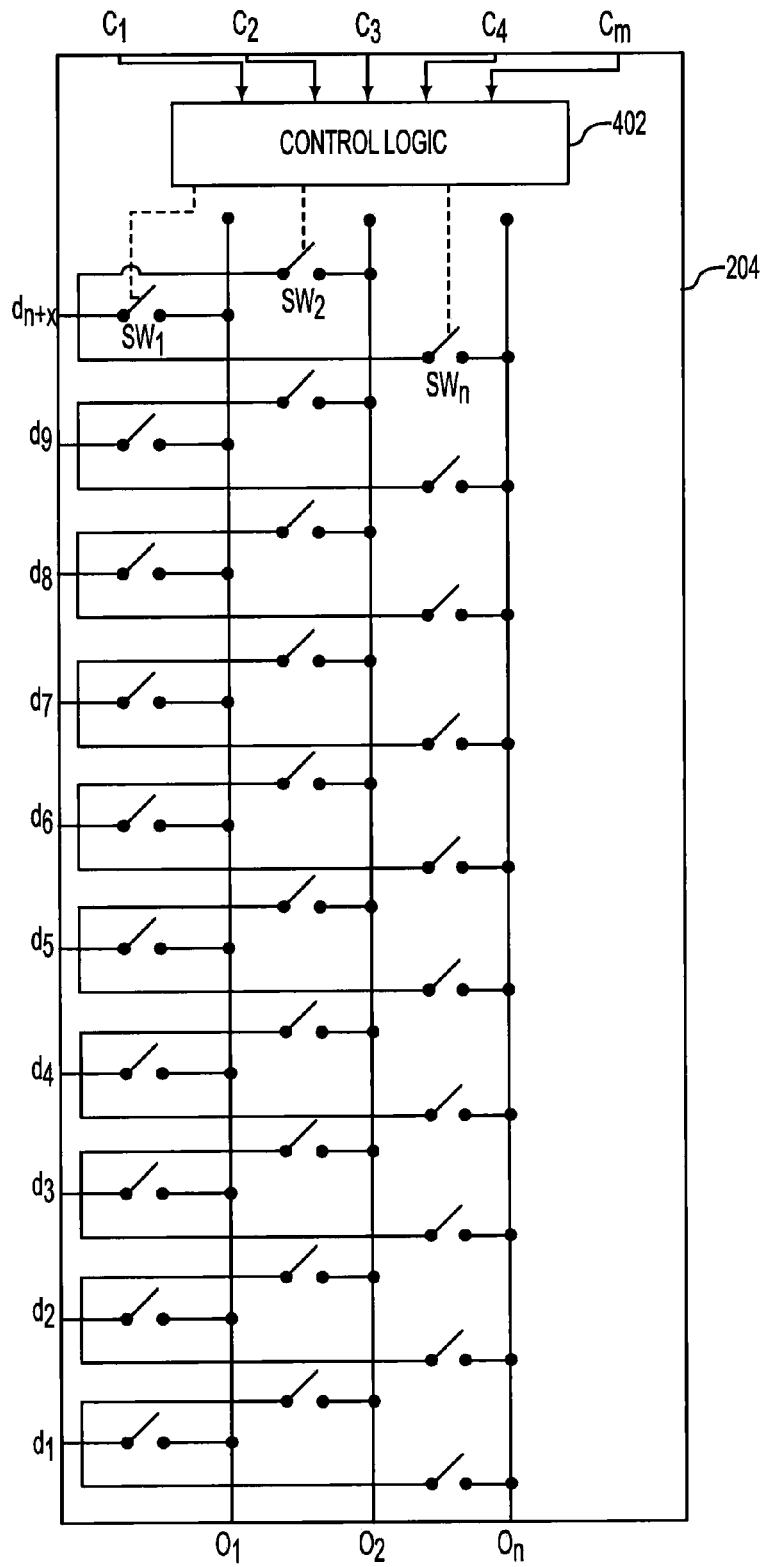
FIG. 4 illustrates a block diagram of an exemplary embodiment of the switching logic portion of FIG. 2.

FIG. 4 illustrates a block diagram of an exemplary embodiment of a switch logic portion 204. In this regard, the switch logic portion 204 includes a control logic portion 402 that is communicatively connected to an array of switches, which may include any suitable switching devices including for example, field effect transistor devices. Each data input node ($d_1$-$d_{n+x}$) is connected to an output node ($O_1$-$O_n$) via switches ($SW_1$-$SW_n$) that are individually controlled by the control logic portion 402. For illustrative purposes the communicative connections between the control logic 402 and the switches corresponding to the input node $d_{n+x}$ are shown, however each switch in the switch logic portion 204 may be individually controlled by the control logic portion 402 such that the closing of a switch affects the communicative connection between a data input node and an output node. In operation, when the control logic portion 402 receives a control signal at a particular control input node, the control logic portion 402 sets the states of each of the switches to a switch configuration associated with the particular control input node to connect the proper data input node to the proper data output node. For example, the signal $S_1$ is output at the output node $O_1$, the signal $S_2$ is output at the output node $O_2$, and the signal $S_n$ is output at the output node $O_n$. If the control signal is received at a different control input node, the control logic portion 204 changes the states of switches to a second switch configuration that is associated with the different control input node.

Figure 5:
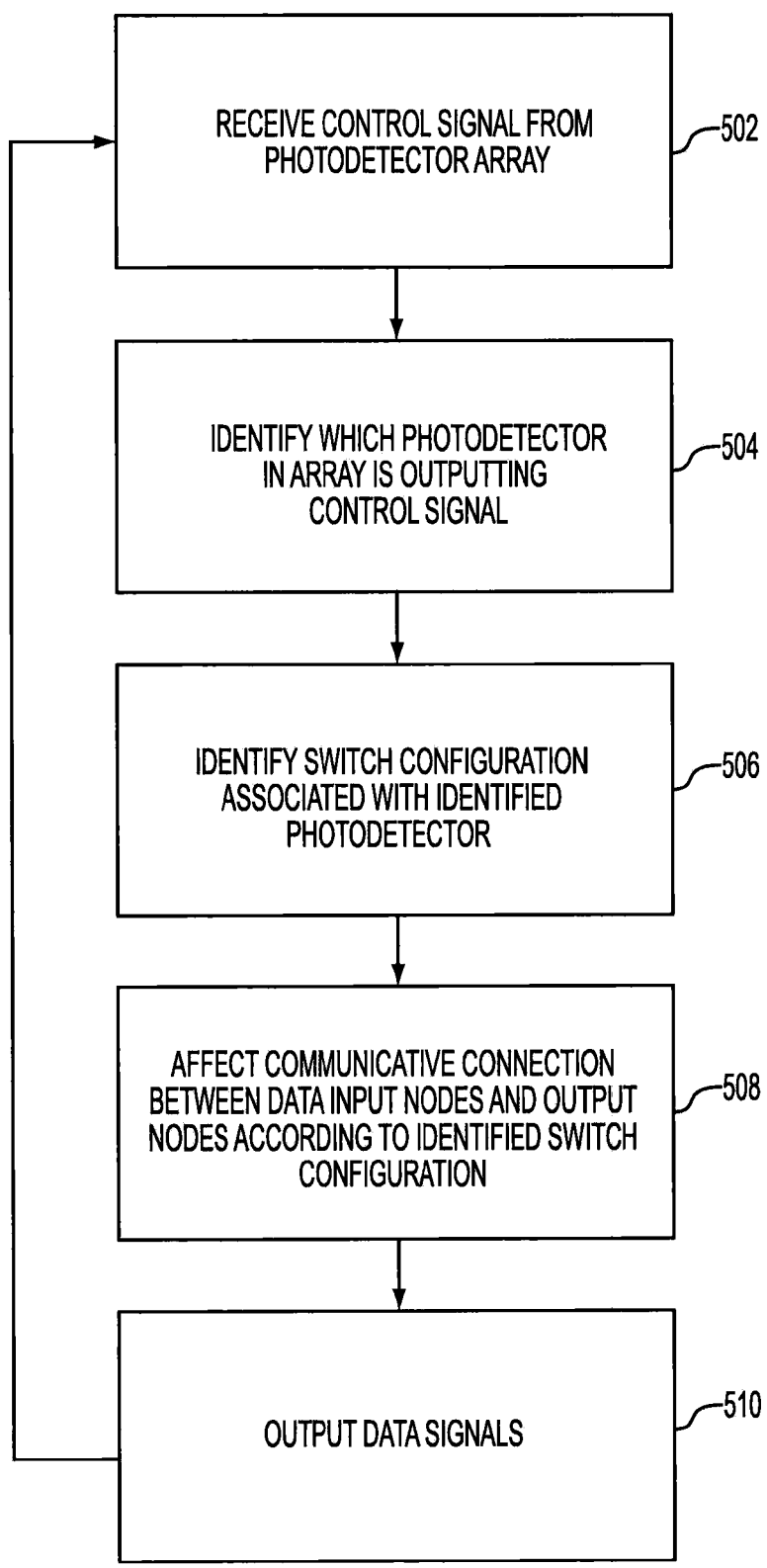
FIG. 5 illustrates a block diagram of an exemplary method of operating an AWG and a switching logic portion.

FIG. 5 illustrates a block diagram of an exemplary method for operating the embodiments of the systems described above. In block 502, the switching logic portion 204 (of FIG. 2) receives a control signal from the control array 212 at a control input node. The switching logic portion 504 identifies which photodetector in the control array 212 is outputting the control signal by identifying which control input node is receiving the control signal in block 504. In block 506, the switching logic portion 204 associates data signals (e.g., channels) from the photodetector array with input data nodes. In this regard, the switching logic portion identifies a switch configuration that is associated with the identified control input node. In block 508, the switching logic portion 204 applies the switch configuration (e.g., changes the states of switches) to affect a communicative connection between data input nodes receiving a data signal and an output node corresponding to the data signal. The data signals are output in block 510. If the control signal is received at a second control input node, the process may be repeated to change the states of switches by applying a second switch configuration that is associated with the second control input node.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An optical de-multiplexing device, comprising:
    an arrayed waveguide grating (AWG) unit configured to receive an input optical signal having a plurality of channels, each corresponding to a different wavelength;
    the AWG unit including a plurality of optical waveguides each having different lengths so as to separate the plurality of channels;
    a first array of photodetectors positioned to receive optical data signals output from the plurality of optical waveguides, the first array of photodetectors configured to convert the optical data signals to respective electrical data signals;
    a second array of photodetectors positioned to receive an optical control signal output from the plurality of optical waveguides, the second array of photodetectors configured to convert the optical control signal to an electrical control signal; and
    a switching logic portion communicatively coupled to the first and second arrays of photodetectors, the switching logic portion operative to determine, via the electrical control signal, whether output positions of the optical data signals with respect to the first array of photodetectors have been shifted due to a temperature fluctuation at the AWG unit, and to correlate the electrical data signals with corresponding channels therewith regardless of whether or not the temperature fluctuation has occurred.

2. The device of claim 1, further comprising a processor portion in communication with the switching logic portion, the processor portion configured to receive the electrical data signals via output nodes of the switching logic portion, wherein the switching logic portion further comprises a plurality of data input nodes that receive the electrical data signals, and an array of switching devices that associates a particular data input node to a particular data output node, depending upon the electrical control signal.

3. The device of claim 2, wherein for a total of n channels, each corresponding to a different wavelength ($\lambda_1, \lambda_2 \ldots \lambda_n$) of the input optical signal, there are n+x photodetectors included in the first array of photodetectors, associated with n+x data input nodes included in the switching logic portion, wherein x is a number selected to accommodate spatial shifting of the optical data signals output from the plurality of optical waveguides due to temperature fluctuation.

4. The device of claim 3, wherein the switching logic portion includes n data output nodes.

5. The device of claim 4, wherein there are m photodetectors included in the second array of photodetectors, associated with m control input nodes included in the switching logic portion, wherein m is a number selected to accommodate spatial shifting of the optical control signal output from the plurality of optical waveguides, such that the optical control signal is detected by at least one of the m photodetectors, regardless of temperature fluctuation.

6. The device of claim 5, wherein the switching logic portion includes a control signal output node that communicates the electrical control signal to the processor portion.

7. The device of claim 6, wherein the optical control signal and the electrical control signal also communicate data to the processor portion.

* * * * *